United States Patent [19]
Kamizono et al.

[11] Patent Number: 5,611,704
[45] Date of Patent: Mar. 18, 1997

[54] ELECTRICAL CONNECTOR

[75] Inventors: Tsutomu Kamizono; Tetsuya Takafuji, both of Kariya, Japan

[73] Assignee: Nippondenso Co., Ltd., Kariya, Japan

[21] Appl. No.: 421,964

[22] Filed: Apr. 14, 1995

[30] Foreign Application Priority Data

Apr. 26, 1994 [JP] Japan .................................. 6-088196

[51] Int. Cl.$^6$ .................................................. H01R 35/04
[52] U.S. Cl. ............................ 439/164; 439/488; 439/15
[58] Field of Search ................................... 439/164, 488, 439/491, 15

[56] References Cited

U.S. PATENT DOCUMENTS

| | | | |
|---|---|---|---|
| 4,789,342 | 12/1988 | Shitanoki | 439/164 |
| 5,127,841 | 7/1992 | Bannai et al. | 439/164 |
| 5,314,341 | 5/1994 | Kazita et al. | 439/15 |
| 5,314,344 | 5/1994 | Ida et al. | 439/164 |
| 5,389,002 | 2/1995 | Matsuda et al. | 439/164 |

FOREIGN PATENT DOCUMENTS

332075  7/1991  Japan .

*Primary Examiner*—Gary F. Paumen
*Attorney, Agent, or Firm*—Cushman, Darby & Cushman IP Group of Pillsbury Madison & Sutro LLP

[57] ABSTRACT

An electrical connector has a flexible cable housed in a case, wherein one end thereof is attached to a rotating member and the other end is attached to a fixed member. The cable is wound around the rotating member and the fixed member to form loose windings of a plurality of turns. A rotation support member is installed in the case so that the rotation support member can rotate around the fixed member and the flexible cable is wound around a perimeter thereof several times. An elastic member connects the rotation support member and the fixed member and generates a returning force responsive to rotation of the rotation support member. Cable codes are formed on the flexible cable in order to indicate a rotation angle of the rotating member. A detection device is installed in the case and generates a signal representing the cable codes.

5 Claims, 9 Drawing Sheets

ELECTRICAL CONNECTOR

CROSS REFERENCE TO RELATED APPLICATION

This application is based upon and claims priority from Japanese Patent Application No. Hei. 6-88196 filed Apr. 26, 1994, the contents of which are incorporated herein by reference.

BACKGROUND OF THE INVENTION

1. Field of the Invention

The present invention relates to an electrical connector which provides electrical connection between relatively rotatable components, i.e. between components located on a rotatable side and a stationary side.

2. Related Art

Japanese Patent application No. Hei. 5-180099, which is equivalent to U.S. Pat. No. 5,389,002 issued Feb. 14, 1995, describes an electrical connector in which, even if a cable with low elasticity is used as a flexible cable, buckling of the flexible cable is prevented and smooth movement during winding of the flexible cable is possible.

There are many devices which attempt to improve the running stability of a vehicle or riding comfort of passengers. These devices detect a turning condition of the vehicle and control a running condition of the vehicle accordingly. Examples of such devices include an electronic control suspension device that adjusts suspension rigidity, a 4-wheel steering control device and a stabilizer control device. Most of these devices utilize a steering sensor in order to detect the turning condition of the vehicle. The steering sensor detects a rotating condition of a steering shaft. This sensor is located either around the steering shaft or inside a combination switch device. The rotating condition is detected based on a signal output according to whether or not a light of a photo interrupter is shielded by a slit panel which rotates with the steering shaft. Details of the steering sensor are explained in the Vehicle Terms Dictionary published by the Toyota Technical Association.

In recent years, there has been an increased demand for reducing the space occupied by a steering device and the other components provided in the surrounding area. Thus, the steering sensor and any electrical connector located around the steering shaft, must be downsized.

However, the electrical connector and the steering sensor were independently installed around the steering device. In such case, even if the sizes of both the electrical connector and the steering sensor are reduced, there is a limit to the amount of space they can save in the surrounding area of the steering shaft. That is, since the electrical connector and the steering sensor was arranged coaxially to the steering shaft, they occupied a large space near the combination switch device.

SUMMARY OF THE INVENTION

It is an object of the present invention to provide an electrical connector which can detect a rotation angle of a rotating member.

It is another object of the present invention to make a size of an electrical connector small.

The electrical connector according to the present invention has a flexible cable housed in a case, wherein one end of the flexible cable is attached to a rotating member and the other end is attached to a fixed member. The cable is wound around the rotating member and the fixed member to form loose windings of a plurality of turns. A rotation support member is installed at a predetermined position between the fixed member and the case so that the rotation support member can rotate and contact the flexible cable which is wound around a perimeter thereof several times. An elastic member connects the rotation support member and the fixed member, and generates a returning force responsive to rotation of the rotation support member. Cable codes are formed on the flexible cable in order to indicate a rotation angle of the rotating member. A detection device is installed in a cable path formed in the case and generates the signal representing the cable codes. As a result, when the flexible cable around the rotating member is tightened or loosened due to rotation of the rotating member, the rotation support member rotates according to the tightening or loosening of the cable, and, when the cable is loosened after being tightened onto the rotating member, the rotation support member rotates by the returning force generated from the elastic member, and the flexible cable is wound onto a perimeter of the rotation support member.

Since the cable codes are formed on the flexible cable and the detection device installed in the case generates the signal representing the cable codes, it is possible to save space occupied by the electrical connector and the detection device, compared to a case wherein the detection device and connector are provided separately. Furthermore, it is also possible to detect a rotation origin of the rotating member easily based on the signal representing the cable codes.

The rotation support member is urged to rotate by the returning force of the elastic member. Therefore, the flexible cable is wound onto a perimeter of the rotation support member. As a result, buckling of the flexible cable is prevented and the flexible cable can be wound smoothly onto the perimeter of the rotation support member.

The detection device includes an emitter for emitting a light and a receiver for receiving the light from the emitter. The emitter and the receiver are locate in the cable path formed in the case.

When such an electrical connector is used for a steering wheel device of a vehicle, it is possible to save space around the steering wheel device.

Furthermore, the rotation support member is forced to rotate by the elasticity of the elastic member, and thereby the flexible cable is wound up onto the perimeter of the rotation support member. Buckling of the flexible cable is prevented and the flexible cable can be wound up smoothly onto the perimeter of the rotation support member.

The detection means includes an emitter for emitting a light and a receiver for receiving the light from the emitter. The emitter and the receiver are located at a side of the flexible cable in a width direction of the flexible cable, and the substrate which supplies the electrical power to the emitter and the receiver is laid extending on sides of the flexible cable and the disc member. By this arrangement, it is possible to reduce a size of the connector in a radial direction of the rotating member.

A cable code or an output portion is formed on the flexible cable, and the detection means installs in the case so that it can read the cable code or the output portion of the flexible cable and output a signal corresponding to the cable code or the output portion. The signal expresses the rotation angle of the rotating member. In this case, it is possible to detect a rotation origin of the rotating member easily.

When such an electrical connector is used for a steering wheel device of vehicle, it is possible to save space around the steering wheel device.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DERAILED DESCRIPTION OF THE PREFERRED EMBODIMENTS

The preferred embodiments of the present invention will be described in detail with reference to the attached figures.

In the first embodiment, the present invention is applied to an electrical connector that connects a passenger protection device, such as an airbag device, with a power supply mounted on a vehicle body.

Figure 4:
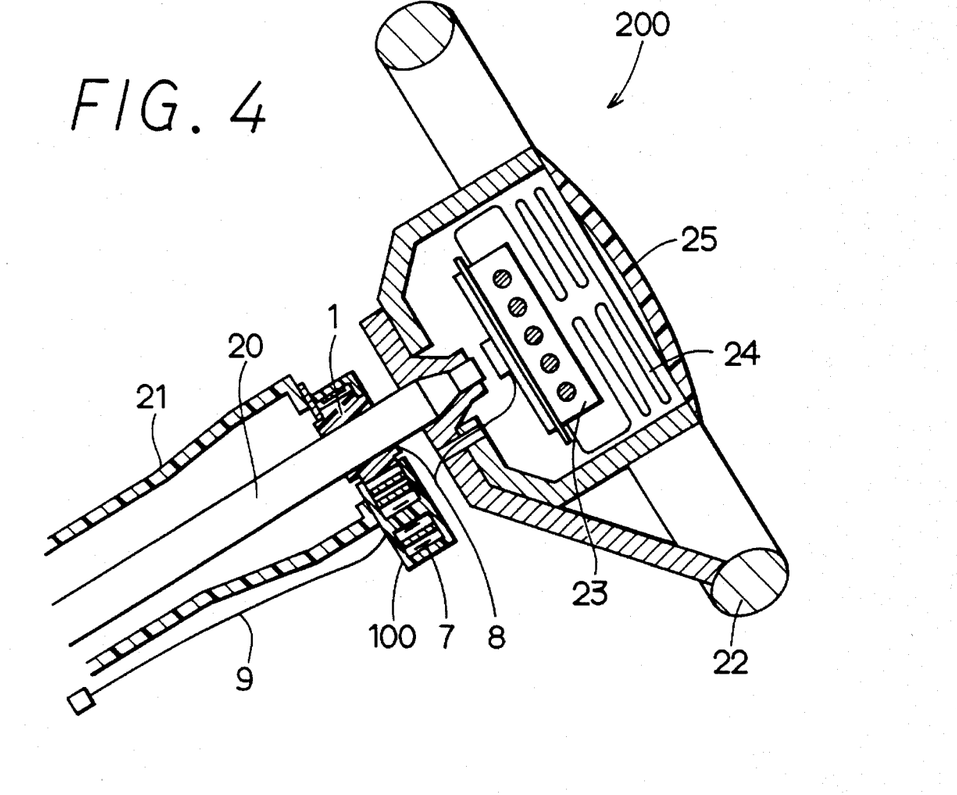
FIG.4 is a cross-sectional configuration view of a steering wheel adopting an electrical connector of the first embodiment according to the present invention.

FIG. 4 is a cross-sectional configuration view of steering wheel device 200 adopting electrical connector 100 of the first embodiment. In FIG. 4, steering shaft 20 is contained in cabinet 21, and steering wheel 22 is attached to an end portion thereof. Rotating member 1 of connector 100 is secured to a periphery of steering shaft 20. When steering wheel 22 is operated, rotating member 1 secured to the periphery of steering shaft 20 also rotates.

The airbag device is installed inside steering wheel 22. Airbag 24 and inflator 23 of the airbag device are 0 contained in pad 25. Inflator 23 is comprised of an ignition element and a gas generator, etc. This inflator 23 is electrically connected to connector 100 with first connection cable 8 and a first connection terminal (not illustrated in the figure). 5 Connector 100 having flat cable 7 as a flexible cable is equipped with second connection cable 9 and a second connection terminal (not illustrated in the figure). Second connection cable 9 is electrically connected to the vehicle power supply (not illustrated in the figure). Thus, the vehicle power supply and inflater 23 are electrically connected with first and second connection cables 8,9, the first and second connection terminals and flat cable 7.

The operation of the first embodiment described above will be explained.

In FIG. 4, when a computer (not illustrated) determines based on an acceleration signal from an acceleration sensor (not illustrated) that a vehicle collision has occurred, the computer allows the power supply to supply electric power to inflator 23 through second connection cable 9, connector 100 and first connection cable 8. Inflator 23 generates an inflation gas in response to the supply of the electric power. Airbag 24 filled with the inflation gas then breaks through pad 25 and expands. Inflated airbag 24 absorbs shock to a driver caused by the vehicle collision and protects the driver.

Next, electrical connector 100 will be described in detail.

Figure 1:
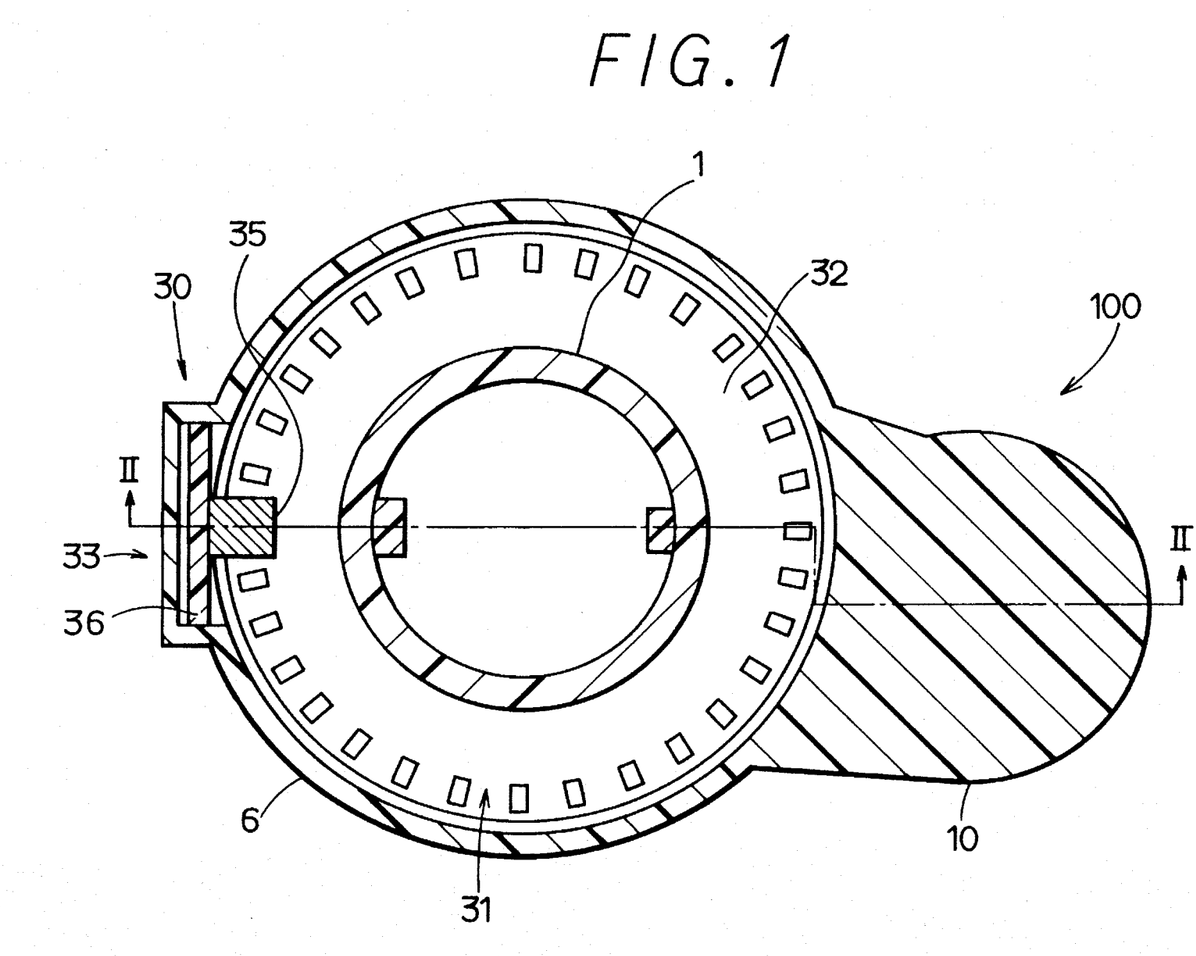
FIG. 1 is a cross-sectional view taken on line I—I of FIG.2, illustrating a configuration of the first embodiment according to the present invention.
Figure 2:
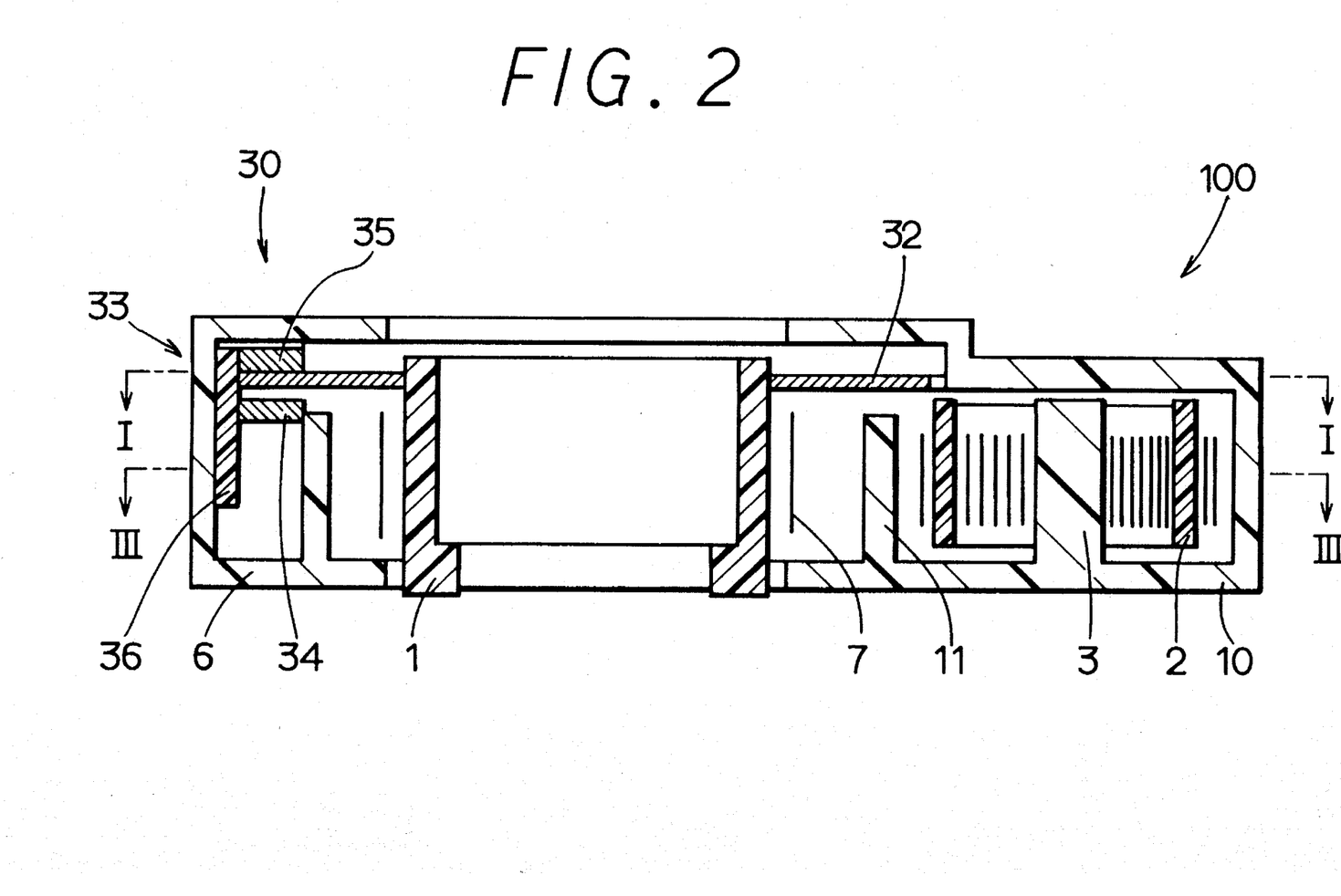
FIG. 2 is a cross-sectional view taken on line II—II of FIG. 1.
Figure 3:
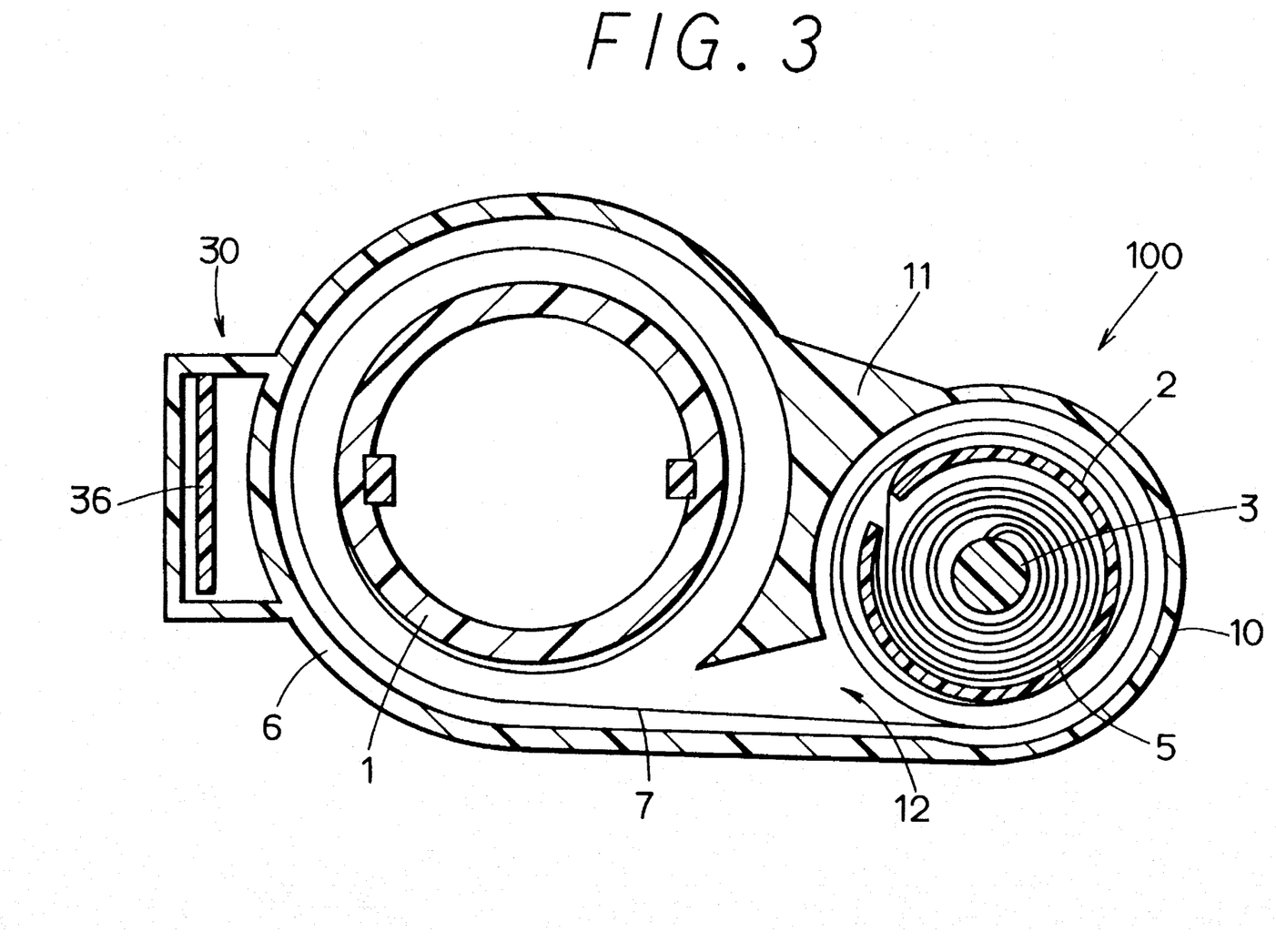
FIG. 3 is a cross-sectional view taken on line III—III of FIG.2.

FIG. 1 is a cross-sectional view taken on line I—I of FIG. 2, the cross-sectional view illustrating a configuration of electrical connector 100 according to the first embodiment. FIG. 2 is a cross-sectional view taken on line II—II of FIG. 1. And FIG. 3 is a cross-sectional view taken on line III—III of FIG. 2.

In FIGS. 1 to 4, connector 100 is comprised of rotating member 1 that is fixed to steering shaft 20 and rotates according to the operation of steering wheel 22, first case 6 with smooth internal surface, established in the periphery of rotating member 1 at a predetermined interval, flat cable 7, and winding core 3 (equivalent to a fixed member) engaged with or integrated with second case 10 with a smooth internal surface for winding up flat cable 7. Second case 10 is set around winding core 3 at a predetermined interval. First case 6 and second case 10 can be integrated.

In addition, rotation support member 2 is established coaxially with winding core 3 between second case 10 and winding core 3, and can rotate around winding core 3. Panel-type spiral spring 5 (equivalent to an elastic member) is wound together with flat cable 7 inside rotation support member 2 and connects rotation support member 2 and winding core 3, and thereby Panel-type spiral spring 5 generates a returning force corresponding to the rotation of rotation support member 2. Cable path 12 is formed by wall 11 in order to connect cables wound on rotating member 1 and rotation support member 2.

In the first embodiment, steering sensor 30 configured as stated below is built into connector 100. The following is a description of the configuration of steering sensor 30 and connector 100, based on FIGS. 1, 2 and 3. Steering sensor 30 detects a rotation angle or a rotation direction when steering shaft 20 rotates by the operation of steering wheel 22.

Slit panel 32 (equivalent to a disc member) with many slits 31 is fixed to rotating member 1. Rotating member 1 and slit panel 32 can be integrated. Slits 31 are each formed on a perimeter of slit panel 32 at equal intervals. Furthermore, a photo interrupter 33 (equivalent to detection means) is installed in first case 6 which does not rotate together with steering shaft 20 when steering wheel 22 is operated. Photo interrupter 33 includes receiver 34 and emitter 35. Receiver 34 and emitter 35 are formed on print substrate 36 so that the perimeter of slit panel 32 and slits 31 are located therebetween. Receiver 34 outputs signals according to whether a light emitted from emitter 35 to receiver 34 is interrupted by slit panel 32 or allowed to pass through slits 31. In addition, print substrate 36 has a power supply circuit connected to both receiver 34 and emitter 35 for supplying electric power thereto. Print substrate 36 is located in first case 6 so that it protrudes from the portion where receiver 34 and emitter 35 are laid towards the bottom of FIG. 2. In other words, print substrate 36 is laid on the inside of first case 6 extending sides of slit panel 32 and flat cable 7. In this manner, print substrate 36 is laid parallel to an axis center of steering shaft 20 as shown in FIG. 2.

The following is an explanation of operations of connector 100 configured as described above.

When steering wheel 22 is operated, steering shaft 20 rotates. Since rotating member 1 rotates together with steering shaft 20, flat cable 7 is wound on or is released from rotating member 1 depending on a rotating direction of steering shaft 20. When flat cable 7 is wound on rotating member 1, the winding of flat cable 7 around rotating support member 2 is tightened, after that, rotating support member 2 rotates as a result of being pulled by rotating member 1. On the other hand, when flat cable 7 is released from rotating member 1, flat cable 7 is sent toward rotating support member 2. Since a returning force of plate-type spiral spring 5 acts on rotating support member 2 when flat cable is wound on rotating member 1, rotating support member 2 rotates to wind flat cable 7 by the returning force. Therefore, even if steering wheel 22 is operated, the rotation of steering shaft 20 is absorbed by the winding of flat cable 7. The electrical connection between inflator 23 and the power supply can be assured. Furthermore, it is possible to shorten the length of flat cable 7 because connector 100 has two axes for winding flat cable 7. Thus, connector 100 can be miniaturized.

Rotating member 1 of connector 100 rotates by the operation of steering wheel 22 as described above. In correspondence, the slit panel 32 also rotates. The light output from emitter 35 of photo interrupter 33 is interrupted or let through depending on the periphery of slit panel 32 and slits 31 that pass between the emitter 35 and receiver 34 according to the rotation of slit panel 32. Receiver 34 formed on print substrate 36 outputs the signals indicating the rotation angle of steering shaft 20. The output signal is transmitted to the computer. Based on the detected signal, the rotation angle of steering shaft 20 is computed at the computer. The rotation angle of steering shaft 20 expresses a steering operation amount or a steering angle of steering wheel 22 when a driver operates steering wheel 22. With such a rotation angle, a turning condition of the vehicle or a lateral acceleration acting in a crosswise direction of the vehicle are determined. The turning condition or the lateral acceleration is used for improving a running stability of the vehicle or a riding comfort for passengers of the vehicle. For example, a suspension control device controls a damping force of a shock absorber based on the turning condition or the lateral acceleration.

The following is a description of effects of connector 100 configured and operated as mentioned above.

With the connector 100 mentioned above, it is possible to electrically connect inflator 23 installed in rotating steering wheel 22 and the power supply mounted on a vehicle body. Furthermore, the rotation angle of steering shaft 20 can be detected. Thus, it is possible to reduce the space around steering shaft 20 compacted to a device that an electrical connector and a steering sensor were arranged independently.

As shown in FIG. 2, when steering sensor 30 is built into connector 100, print substrate 36 is laid on the sides of flat cable 7 and slit panel 32. Thus, it is possible to further reduce the size of connector 100 with built-in steering sensor 30 in the axial direction of steering shaft 20.

Figure 5:
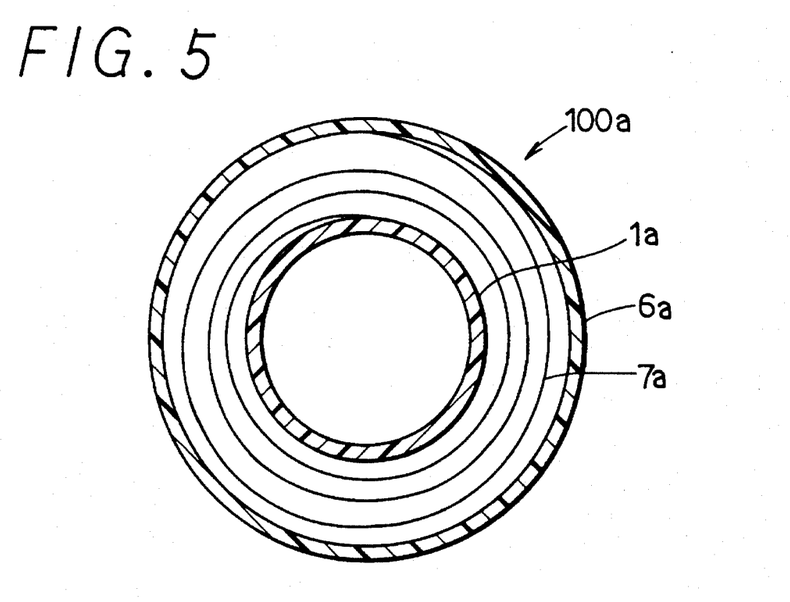
FIG. 5 is a cross-sectional view taken on line V—V of FIG. 6, illustrating a configuration of the second embodiment according to the present invention.
Figure 6:
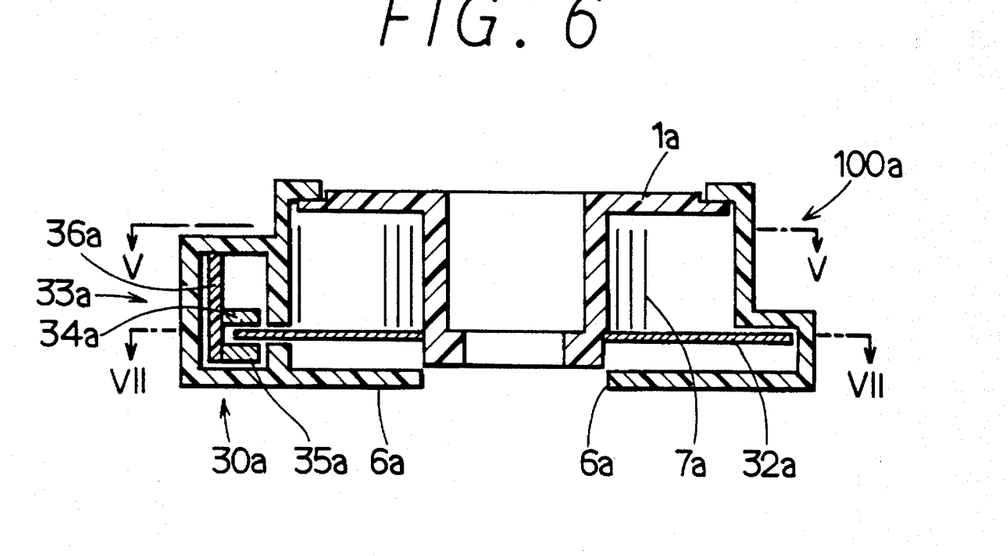
FIG. 6 is a cross-sectional view taken on line VI—VI of FIG. 7.
Figure 7:
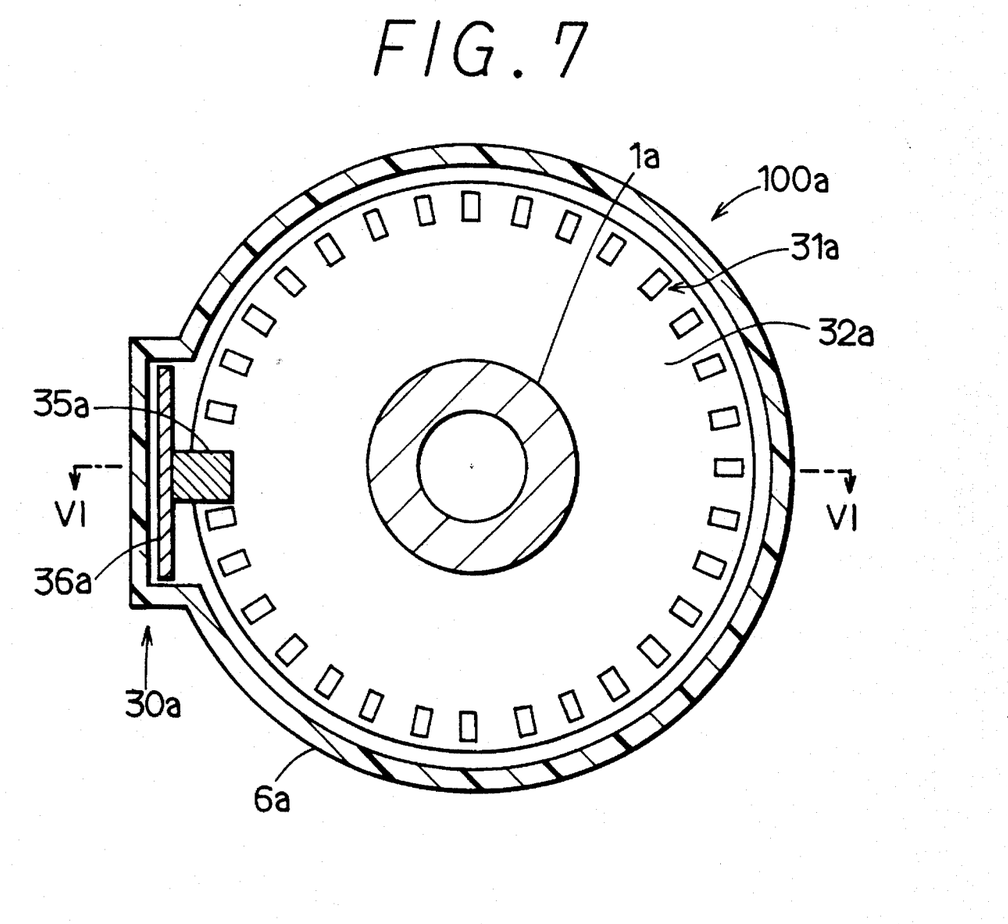
FIG. 7 is a cross-sectional view taken on line VII—VII of FIG. 6.

The second embodiment according to the present invention will be described with reference to FIGS. 5, 6, and 7.

The second embodiment refers to an electrical connector which is a single axis-type connector as disclosed in Japanese Utility Model examined publication No. 3-32075. FIG. 5 is a cross-sectional view taken on line V—V of FIG. 6, illustrating a configuration of the second embodiment. FIG. 6 is a cross-sectional view taken on line VI—VI of FIG. 7. FIG. 7 is a cross-sectional view taken on line VII—VII of FIG. 6.

The following is a description of a configuration of electrical connector 100a in the second embodiment. First case 6a is arranged coaxially and at a specified interval to rotating member 1a that rotates together with the operation of steering wheel 22 by the driver. Flat cable 7a is wound several times around rotating member 1a to form a loose winding of a plurality of turns therearound. One end of this flat cable 7a is attached to first case 6a, and in case that connector 100a is set in the steering device illustrated in FIG. 4, an electrical connection with cabinet 21 side is created through this attached portion to first case 6. The other end of flat cable 7a is attached with rotating member 1 for creating an electrical connection with the rotating steering wheel 22. Slit panel 32a having slits 31a formed on its perimeter is engaged on rotating member 1a or integrated with rotating member 1a so that it rotates together with rotating member 1a. Photo interrupter 33a of steering sensor 30a is located at a side of flat cable 7a. Receiver 34a and emitter 35a of photo interrupter 33a are formed on print substrate 36a so that the perimeter of slit panel 32a formed slits 31a is located therebetween. Receiver 34a outputs a signal expressing a rotation angle of steering shaft 20. The rotation angle of steering shaft 20 is computed at the computer (not illustrated in the figure) based on the signal output from receiver 34a. Print substrate 36a is installed in case 6a so that it will be positioned at sides of flat cable 7a and slit panel 32a.

The following is a description of operations and effects of the second embodiment configured as mentioned above. When rotating member 1a rotates according to the operation of steering wheel 22, flat cable 7a is either wound or loosened to/from the winding member 1a. Slit panel 32a rotates as rotating member 1a rotates in response to the operation of steering wheel 22. At this time, a light emitted from emitter 35a of photo interrupter 33a passes through slits 31a or is interrupted by the perimeter of slit panel 32a. Receiver 34a outputs a signal when it receives the light from emitter 35a. Thus, the rotation angle of steering wheel 22 is detected based on the signal output from receiver 34a.

As mentioned above, it is possible to build the steering sensor 30a into connector 100a with a single axis for winding flat cable 7a. Furthermore, it is possible to reduce the size of connector 100a with built-in steering sensor 30a in an axial direction of steering shaft 20 because print substrate 36a of steering sensor 30a is located in case 6a so that it extends to the sides of flat cable 7a and slit panel 32a.

Figure 8:
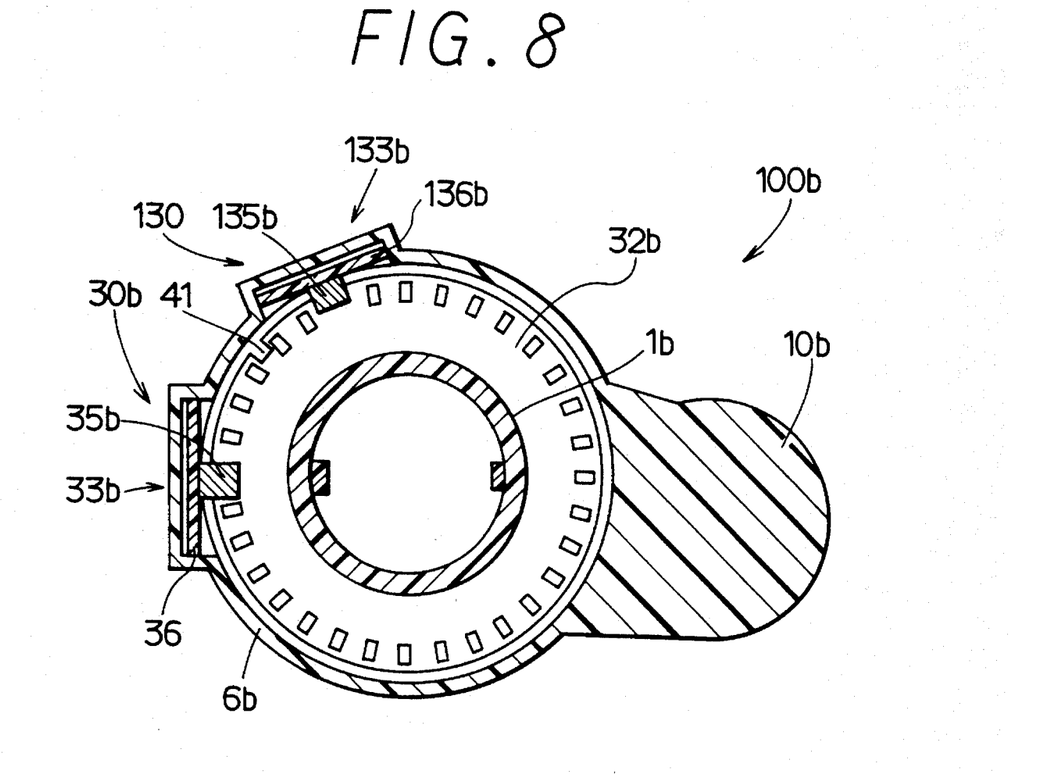
FIG. 8 is a configuration view of the third embodiment according to the present invention.

Next, the third embodiment of the present invention will be described with reference to FIG. 8.

In the third embodiment, connector 100b provides steering sensor 30b that can detect a rotation origin along with the rotation angle of steering shaft 20. This rotation origin is used for outputting a signal to reset a computation error of the rotation angle of steering shaft 20. For example, if steering wheel 22 is operated at a certain angle when the power supply to the computer is stopped by turning off an ignition switch of the vehicle, a computation of the rotation angle is performed based on the rotation angle at the time when the electrical power is supplied again. Since accurate computation of the rotation angle cannot be carried out under this condition, the computation of rotation angle is reset and the rotation angle is computed based on this rotation origin as the computation standard.

In the third embodiment, each of steering sensors 30b, 130b is equipped with photo interrupters 33b, 133b. One is for outputting the signal expressing the rotation angle of steering shaft 20. The other is for outputting a signal expressing the rotation origin. Print substrates 36b, 136b are located at the sides of the flat cable (not illustrated in FIG. 8) and slit panel 32b in case 6b, in the same manner as described in the first embodiment. Furthermore, an origin detection slit 41 is formed onto an outermost perimeter of slit panel 32b. Single rotation of slit panel 32b that rotates together with steering shaft 20 is detected by this origin detection slit 41 and newly installed photo interrupter 133b. In other words, detection of the rotation origin is carried out once for every rotation of steering wheel 22. Thus, when the steering wheel 22 rotates two or three times, the rotation origin is detected in two or three portions by the rotation of steering wheel 22 In such a case, the correct rotation origin is detected by using learning control at the computer, which determines a reset timing of the computation of the rotation angle. It is thus possible to build steering sensor 130b into connector 100b and provide a rotation origin detection function by steering sensor 130b. It goes without saying that in such a case, the same effects as mentioned in the first embodiment can be obtained, and by jointly using the abovementioned learning control, it is possible to detect the rotation origin of steering shaft 20. Thus, the rotation angle of steering shaft 20 can be computed accurately.

Next, the fourth embodiment according to the present invention will be described with reference to FIG. 9.

Figure 9:
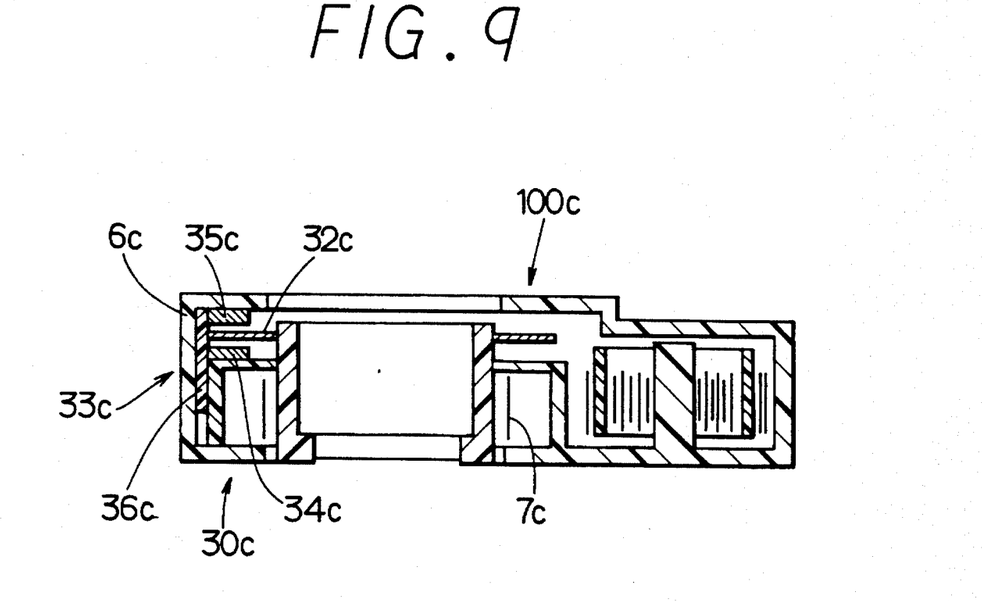
FIG. 9 is a cross-sectional configuration view of the fourth embodiment according to the present invention.

FIG. 9 is a cross-sectional view of connector 100c with built-in steering sensor 30c, wherein the size reduction of connector 100c is realized in a radial direction of steering shaft 20. Steering sensor 30c is built into this connector 100c. Steering sensor 30c includes photo interrupter 33c and slit panel 32c. Slit panel 32c has the same configuration as that described in the first embodiment, however it is possible to shorten a diameter of slit panel 32c.

Emitter 35c and receiver 34c formed on print substrate 36c are arranged in the same manner as the first embodiment so that they sandwich the perimeter portion of slit panel 32c. Print substrate 36c is located in first case 6c so that it extends below from the area where receiver 34c and emitter 35c are formed. That is, print substrate 36c is located at the sides of flat cable 7c and slit panel 32c. Furthermore, receiver 34c and emitter 35c are formed at the side of flat cable 7c in the width direction of flat cable 7c, in other words at the upper side of flat cable 7c.

By constructing connector 100c as described above, it is possible to reduce the size of connector 100c in the radial direction of the steering shaft 20. Furthermore, compared with the first embodiment it is possible to reduce the diameter of slit panel 32c by arranging slit panel 32c, receiver 34c and emitter 35c of steering sensor 30c at the upper side of flat cable 7c.

Next, the fifth embodiment according to the present invention will be described with reference to FIG. 10.

In the fifth embodiment, connector 100d provides origin detector 43d that can accurately and simply detect a rotation origin of steering shaft 20.

Figure 10:
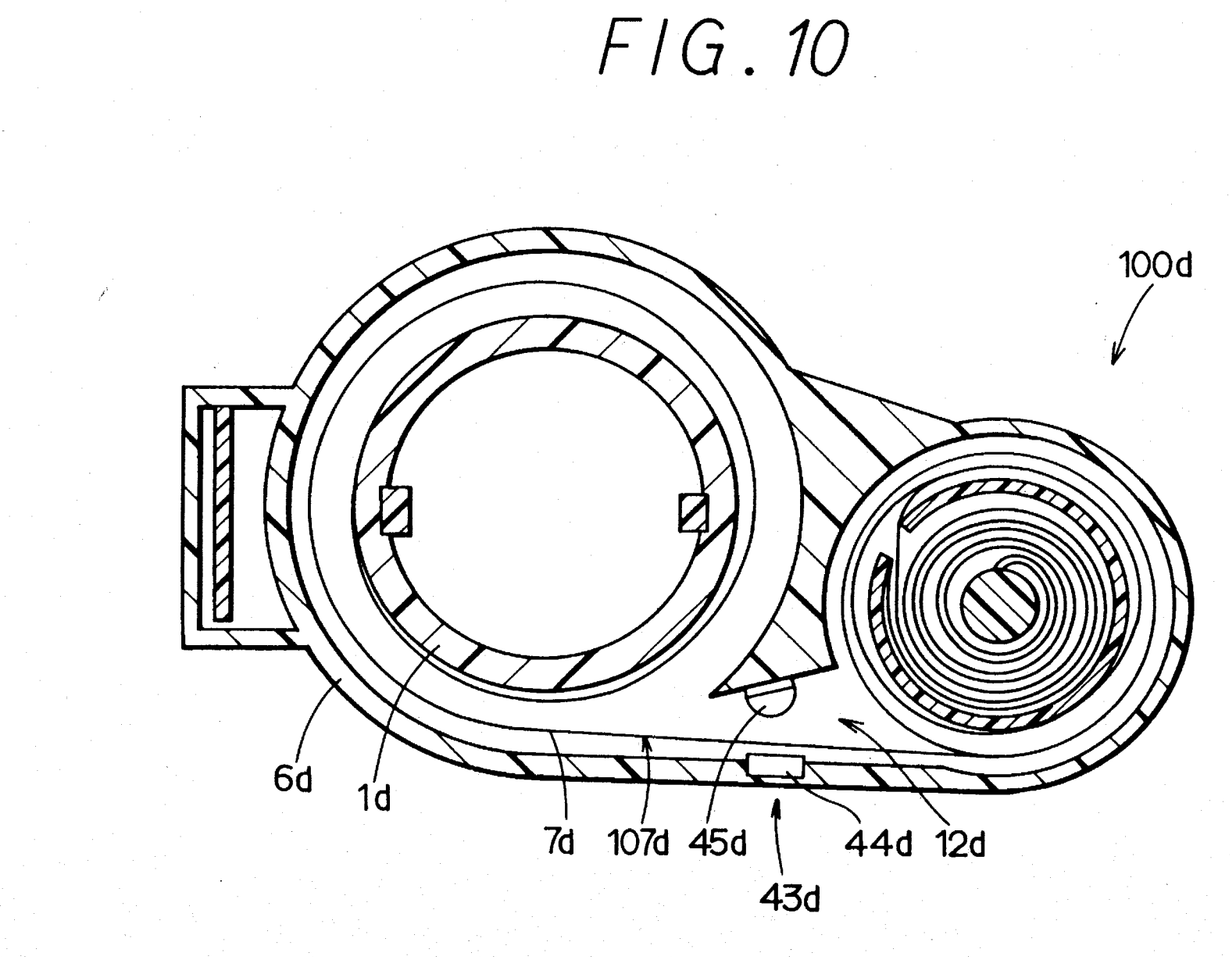
FIG. 10 is a cross-sectional configuration view of the fifth embodiment according to the present invention.

FIG. 10 is a sectional view illustrating connector 100d in the fifth embodiment. In FIG. 10, rotation origin detection slit 107d is formed in flat cable 7d that is wound and laid in the same manner as described in the first embodiment. Furthermore, origin detection photo interrupter 43d composed of emitter 45d and receiver 44d is installed in first case 6d at the sides of cable path 12d. In cable path 12d, flat cable 7d is sandwiched by the emitter 45d and receiver 44d, and rotation origin detection slit 107 passes between emitter 45d and receiver 44d. The rotation origin in the fifth embodiment has the same role as the rotation origin described in the third embodiment.

Functions and effects of connector 100d configured as described above will be explained.

Steering shaft 20 rotates according to the operation of steering wheel 22 by the driver. Since rotating member 1d rotates together with steering shaft 20, the movement of flat cable 7d that moves together with rotating member 1d expresses an operation amount or angle of steering wheel 22. Therefore, the rotation origin of steering shaft 20 can be detected by monitoring the movement of this flat cable 7d through rotation origin detection slit 107 (equivalent to an output portion) and origin detection photo interrupter 45d, and thus accurate computation of the rotation angle of steering shaft 20 can be performed based on the rotation origin.

Furthermore, even when steering shaft 20 rotates several times, rotation origin detection slit 107d formed in flat cable 7d will not be detected several times. This is because only one rotation origin detection slit 107d is formed in flat cable 7d, and flat cable 7d carries out one-on-one movement with the movement of steering shaft 20. Thus, it is possible to detect only the correct rotation origin with this origin detection slit 107d and it is possible to simplify the computation of the rotation angle because it is not necessary to establish the learning control function in the computer.

Figure 11:
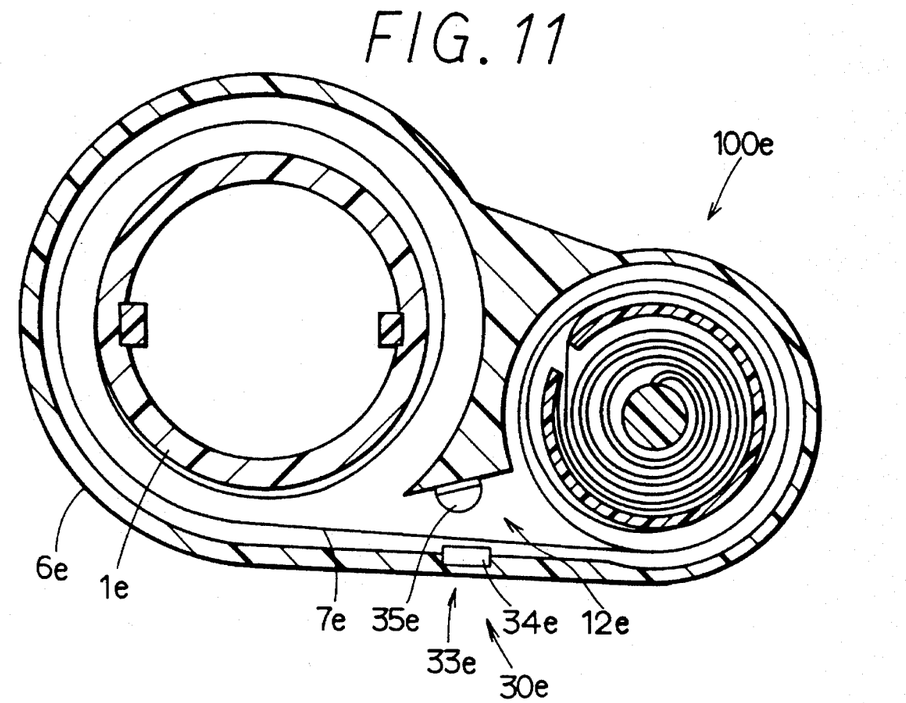
FIG. 11 is a cross-sectional configuration view of the sixth embodiment according to the present invention.

Next, the sixth embodiment according to the present invention will be described with reference to FIGS. 11 and 12.

Figure 12:
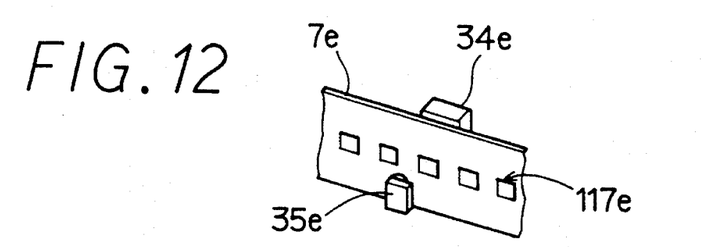
FIG. 12 is a schematic Illustration of a flat cable and photo interrupters for detecting the rotation angle in the sixth embodiment.

As shown in FIG. 12, in the sixth embodiment, slits 117e are formed by creating several slits on flat cable 7e at uniform intervals. Slits 117e are appropriately formed onto the flat cable 7e, avoiding lead wires installed in flat cable 7e. Emitter 35e and receiver 34e of photo interrupter 33e is on opposite at both sides of cable path 12e in first case 6e so that slits 117e passes therebetween.

When steering wheel 22 is operated by the driver, rotating member 1e rotates, and then flat cable 7e is wound around or released from rotating member 1e. The movement of flat cable 7e follows the operation of steering wheel 22, and by detecting the movement of flat cable 7e with slits 117e and photo interrupter 33e, it is possible to detect the operation condition (the rotation angle) of the steering shaft 20. In 5 this manner, by carrying out the detection of the rotation angle of steering shaft 20 with using photo interrupter 33e and flat cable 7e laid on cable path 12e, it is possible to provide a smaller connector 100e with built-in steering sensor 30e.

Next, the seventh embodiment according to the present invention will be described.

Figure 13:
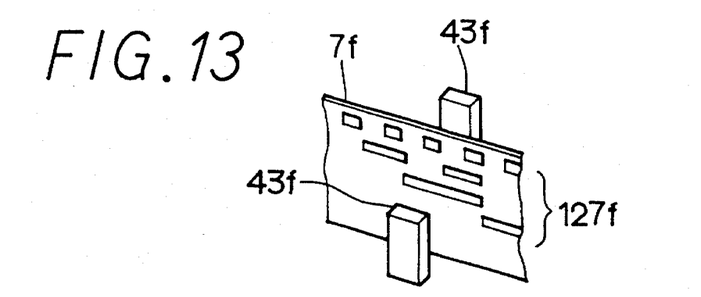
FIG. 13 is a schematic illustration of a flat cable and photo interrupters for detecting a rotation angle in the seventh embodiment according to the present invention.

As shown in FIG. 13, slit group 127f for detecting the rotation condition of steering shaft 20 is formed on flat cable 7f to indicate BCD codes. BCD codes refer to analog cords formed to express binary numbers. The movement of this slit group 127f is detected by photo interrupter 43f having a plurality of receivers and emitters. The emitters can output a BCD code signal corresponding to each portion of flat cable 7f by slit group 127f.

The following is a description of operations and effects of the connector configured as mentioned above.

Since slit group 127f of flat cable 7f is formed to indicate BCD codes, it is possible to detect the rotation origin based on the BCD code signal expressing the rotation origin of steering shaft 20, which is output from the emitters. Furthermore, the rotation angle of steering shaft 20 corresponding to the operation condition of steering shaft 20 can be detected by reading the BCD codes of slit group 127f. Even when power supply is cut during the operation of steering wheel 22, computation error does not occur in the computation of rotation angle of steering shaft 20, and thereby it is not necessary to carry out a detection of the rotation angle in consideration of this error at the computer. That is, when the electrical power is supplied again, the BCD code signal that is output by the emitters expresses an accurate rotation angle of steering shaft 20 at that point. Thus, even when the power supply to the photo interrupters 43f is cut during the computation of the rotation angle, when the electrical power is supplied again, it is possible to compute and detect the accurate rotation angle of steering shaft 20 at that point.

The present invention is not limited to the embodiments described above but can changed in various ways as described below.

Figure 14:
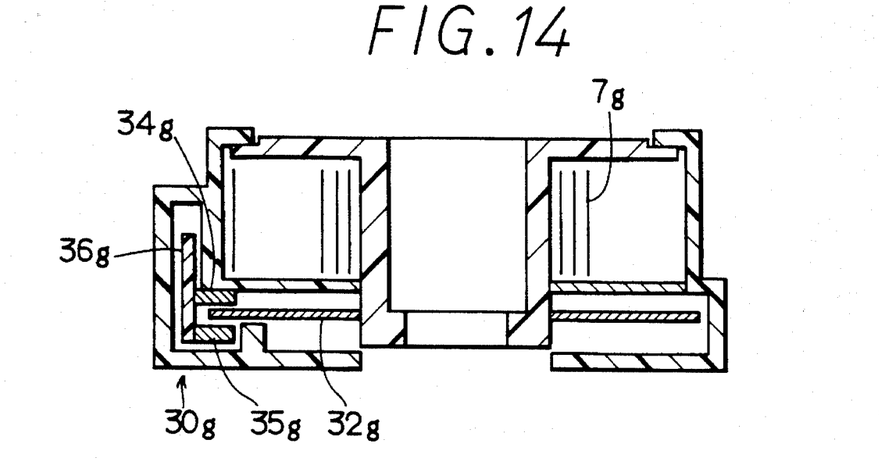
FIG. 14 is a cross-sectional configuration view of an electrical connector in the seventh embodiment according to the present invention.

For example, as shown in FIG. 14, in the single axis-type connector described in the second embodiment, receiver 34g and emitter 35g are formed at the side of flat cable 7g in width direction of flat cable 7g, in other words at the lower side of flat cable 7g. Furthermore, print substrate 36g is laid on the sides of flat cable 7g and slit panel 32g. In this case, a diameter of slit panel 32g may be shorter than that of slit panel 32 in the first embodiment. By the configuration described above, it is possible to reduce the size of the single axis-type connector with built-in steering sensor 30g in a radial direction of steering shaft 20.

Figure 15:
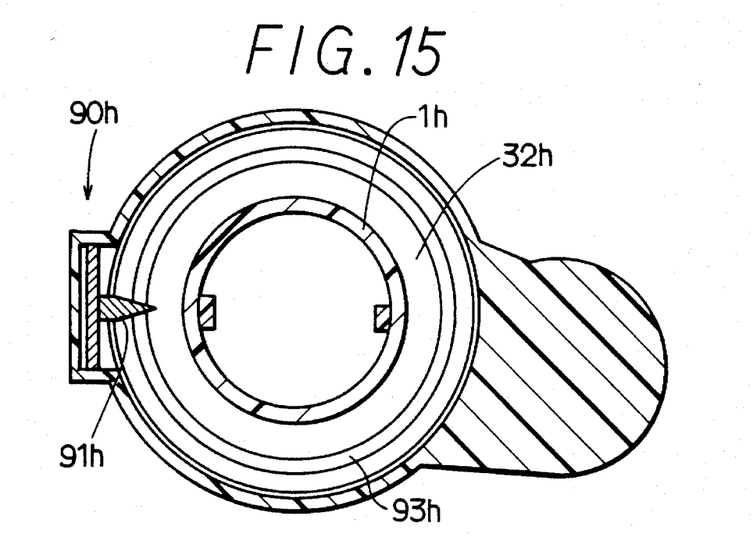
FIG. 15 is a cross-sectional configuration view of an electrical connector in the eighth embodiment according to the present invention.

Furthermore, as shown in FIG. 15, it is possible to form an analog code 93h on disc member 32h that rotates together with rotating member 1h, and to output a signal indicating the rotation angle using brush 91h (equivalent to a disc reading member) included in steering sensor 90h. This analog code 93h is formed on disc member 32h so that brush 91b outputs an analog signal corresponding to a rotation angle of disc member 32h. When analog code 93h formed at disc member 32h is read by brush 91h, swaying and looseness in the axial direction of the disc member 32a is small, and thus analog code 93h can be accurately read by brush 91b. It goes without saying that the rotation direction of disc member 32h, that is, the rotation direction of steering shaft 20 can be detected from the signal based on analog code 93h.

Figure 16:
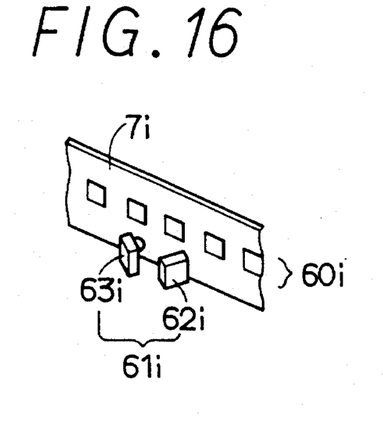
FIG. 16 is a schematic illustration of a flat cable and photo interrupters for detecting a rotation angle in the ninth embodiment according to the present invention.

Furthermore, as shown in FIG. 16, on a surface of flat cable 7, code group 60i that reflects light is printed and photo interrupter 61i are laid at one side of cable path (not illustrated). This photo interrupter 61i is composed of receiver 62i and emitter 63i located at predetermined angles over flat cable 7, and the reflection light from code group 60i of light emitted from emitter 63i can be received by receiver 62i. Receiver 62i outputs a signal in response to the received light. It is possible to compute the rotation angle of steering shaft 20 by detecting the signal indicating the rotation angle thereof.

Through the abovementioned configuration, it is possible to improve a flexibility of laying space for the photo interrupter 61i. Furthermore, code group 60i can be laid anywhere as long as it is on the surface of flat cable 7i, and it is no longer necessary to form slits on flat cable, avoiding lead wires installed in flat cable 7i. Therefore, it is possible to reduce the width of flat cable 7i compared to when slits is created on flat cable.

Figure 17:
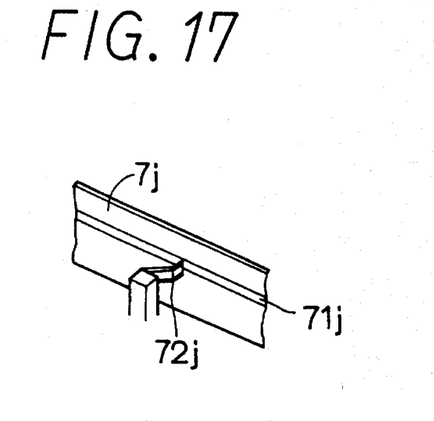
FIG. 17 is a schematic illustration of a flat cable and a brush for detecting a rotation angle in the tenth embodiment according to the present invention.

It is also possible to detect the rotation angle based on a change of resistance, magnetic, sound and capacitance value instead of light. That is, the present invention is not limited to optically detect the movement of flat cable 7 by creating slits or reflection portion thereon. For example, as indicated in FIG. 17, it is possible to set resistance wire 71j onto the surface of flat cable 7j and to connect resistance wire 71j to brush 72j secured on first case (not illustrated). In this case, an analog value corresponding to the rotation angle of steering shaft 20 had been memorized onto resistance wire 71j. By reading the analog value through the contact point of brush 72j to the end of flat cable 7j on resistance wire 71j of flat cable 7j, it is possible to detect the current rotation condition of steering shaft 20. It is also possible to detect the movement of the flat cable, that is, the rotation angle of steering shaft 20 by forming a code group with magnetic ink on the surface of the flat cable and reading the code group by a MRE element. Furthermore, it is possible to detect the rotation angle of steering shaft 20 by forming unevenness on the surface of the flat cable and detecting reflection rates of sound waves when the sound waves are reflected by the unevenness.

In case that the photo interrupter of the steering sensor is composed of a receiver and a emitter in the embodiments mentioned above, it is possible to detect a rotation direction of each slit panel by using more than two pairs of receivers and emitters. The two pair of receivers and emitters are arranged on the substrate so that phases of detecting signals are shifted each other. The rotation direction is detected based on a change of shifted phase. That is, it is possible to detect the rotation direction of steering shaft 20.

What is claimed is:

1. An electrical connector having a flexible cable housed in a case, wherein one end of the flexible cable is attached to a rotating member and the other end is attached to a fixed member, and said cable is wound around said rotating member and said fixed member to form loose windings of a plurality of turns, comprising:

a rotation support member installed at a predetermined position between said fixed member and said case so that the rotation support member can rotate and contact said flexible cable which is wound around a perimeter thereof several times;

an elastic member connecting said rotation support member and said fixed member, and generating a returning force responsive to a rotation of said rotation support member;

cable codes formed on said flexible cable and indicating a rotation angle of said rotating member;

a cable path formed in said case and for allowing said flexible cable to pass therealong; and detection means, installed in said cable path, for detecting said cable codes and generating a signal related thereto;

wherein when said flexible cable around said rotating member is tightened or loosened due to the rotation of said rotating member, said rotation support member rotates according to the tightening or loosening of the cable, and, when said cable is loosened after being tightened onto said rotating member, said rotation support member rotates by the returning force generated from said elastic member, and said flexible cable is wound onto a perimeter of said rotation support member.

2. An electrical connector as claimed in claim 1, wherein said cable codes are composed of a plurality of slits formed at regular intervals on said flexible cable;

wherein said detection means includes a cable code reading member composed of a emitter and a receiver which are installed along said cable path so that said flexible cable is sandwiched therebetween; and wherein a rotation angle of said rotating member is detected based on the signal which is output based on the light received on said receiver after light emitted from said emitter passes through said slits.

3. An electrical connector as claimed in claim 1, wherein said cable codes indicate a digital amount corresponding to the rotation angle of said rotating member, and the rotation angle of said rotating member is detected based on said amount as detected by said detection means.

4. An electrical connector as claimed in claim 1, wherein said cable codes are represented by reflection portions, which reflect light, at regular intervals on the surface of said flexible cable; and wherein said cable detection means is composed of an emitter and a receiver, and the rotation angle of said rotating member is detected based on a signal output from said receiver when the light emitted from said emitter is reflected by said reflection portions and received by said receiver.

5. An electrical connector as claimed in claim 1, wherein said cable codes comprise a resistance wire in which an analog value corresponding to the rotation angle of said rotating member is stored, and said detection means includes a brush which contacts said resistance wire and reads said analog value stored in said resistance wire.

* * * * *